United States Patent Office 3,476,261
Patented Nov. 4, 1969

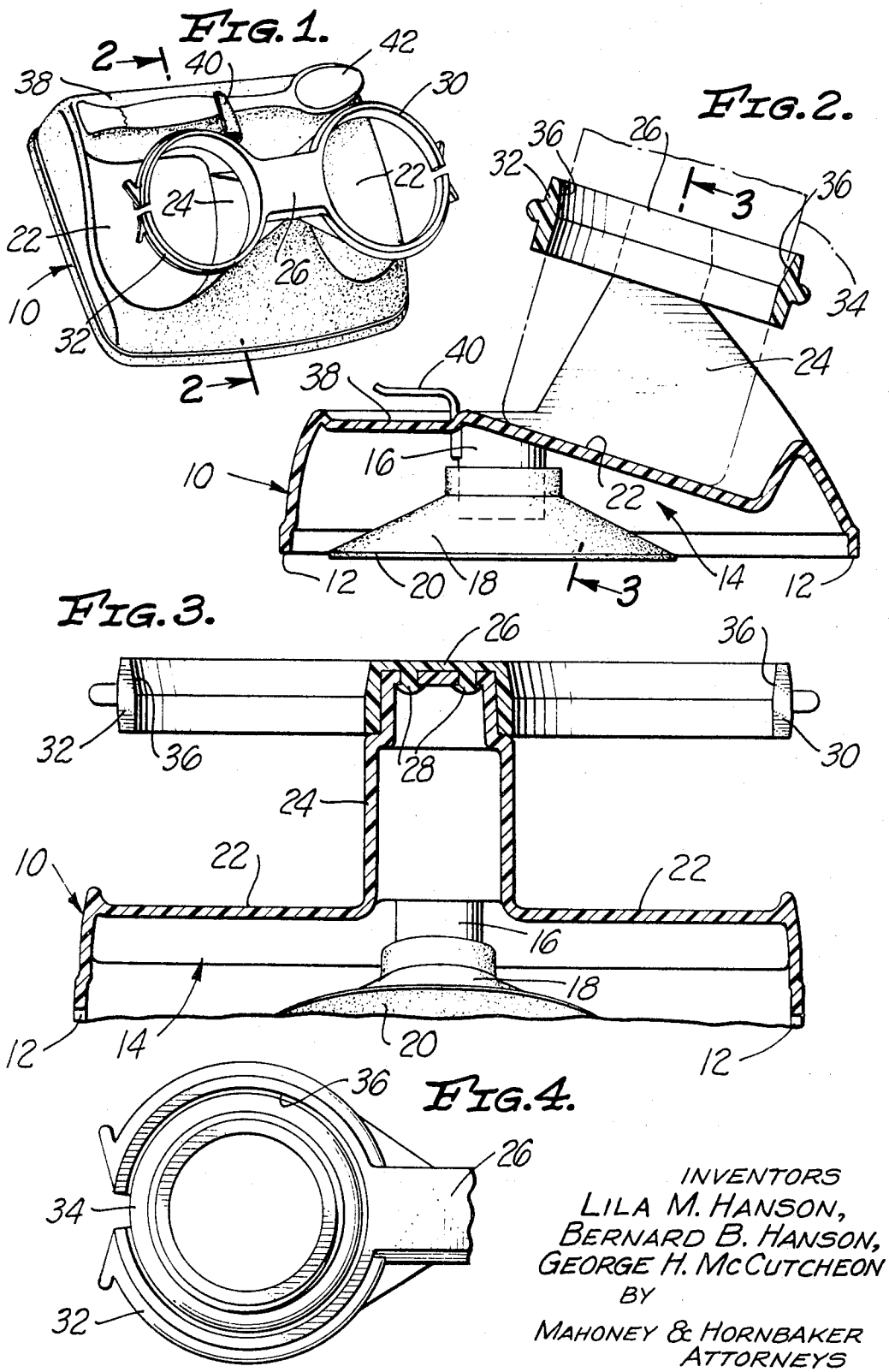

3,476,261
BABY FOOD JAR HOLDER
Lila M. Hanson and Bernard B. Hanson, Englewood, Colo., and George H. McCutcheon, Los Angeles, Calif., assignors to Westland Plastics, Inc., Newbury Park, Calif., a corporation of California
Filed July 31, 1967, Ser. No. 657,356
Int. Cl. A47b *43/00;* F16b *47/00*
U.S. Cl. 211—74        10 Claims

ABSTRACT OF THE DISCLOSURE

A molded plastic base has a lower peripheral edge surface and a center suction cup for supporting and retaining the base on a flat surface. The base upper surface is formed with a pair of angled jar receiving surfaces separated by an upward pedestal. The pedestal mounts a lateral plastic bar having different size split ring ends spaced above and overlying the receiving surfaces, whereby jars of varying size are resiliently peripherally gripped while resting on said surfaces. A spoon positioning surface is formed rearwardly of and aligned with the base receiving surfaces, having an overlying spring clip for retaining a spoon.

Background of the invention

This invention relates to a baby food jar holder specifically adapted for holding jars of baby food during the feeding of the baby by its mother. More particularly, this invention relates to a baby food jar holder of the above character constructed with socket-like receptacles for resiliently retaining baby food jars of varying size for complete versatility in use. The jar holder in preferred form may be of molded plastic so as to be provided at a minimum expense.

In view of modern day food processing and packaging, virtually every form of known food is provided specifically processed for consumption by babies. Such baby food is normally packaged in small jars having removable lids wherein the baby may be fed by the mother directly from the particular jar of baby food.

Probably the only major problem presented with baby food packaged in this manner is that, due to the small size of the jars, such jars must be held by the mother with one hand and the baby fed with a spoon held in the other hand. As a result, the baby's mischievous hands are free to seek their own goal, which frequently is either or both of the food on the spoon or the baby's mouth. This presents obvious and well known difficulties.

Clearly, this problem could be solved if one of the mother's hands were free. Thus, it is highly desirable to provide some means for securely holding the baby food jar out of the range of the baby's hands, but yet secured in a position readily accessible to the mother.

Objects and summary of the invention

It is, therefore, an object of our invention to provide a baby food jar holder which will securely retain jars of various sizes in a position convenient to the user thereof during the feeding of a baby. According to the invention, the jar holder may include one or several socket-like jar holding receptacles, said receptacles being provided with resilient gripping means for peripherally gripping a jar inserted therein so as to securely retain the same. Furthermore, the jar holder is adapted for positioning on a normal supporting surface and may include a suction cup for retaining the same immovable on said supporting surface.

It is a further object of our invention to provide a baby food jar holder wherein the jar or jars are retained therein at a convenient angled position, readily accessible for insertion of a usual spoon for the convenient removal of the contents thereof during the baby feeding operation. The jar holder is formed with the receptacle or receptacles thereof in said angled orientation, preferably by upwardly exposed angled surfaces against which the bottoms of the jars rest and aligned gripping means spaced thereabove for peripherally gripping the jars.

The gripping means are preferably resilient material split rings through which the jars are inserted downwardly against the lower jar receiving surfaces, and the entire construction, with the exception of the previously mentioned suction cup, may be formed of molded plastic for economy of manufacture.

It is still a further object of our invention to provide a baby food jar holder of the foregoing general character which may also include the various jar holding receptacles of different sizes to accommodate a broader range of jar sizes. The different size jar receptacles, in combination with the resilient jar gripping means, provide the holder with maximum versatility so as to accommodate jars or all of the common sizes normally encountered.

In addition, the jar holder may include a unique form of spoon holder directly adjacent the jar receptacle or receptacles for the clip retainment of a spoon which may be used for the baby feeding operation.

Other objects and advantages of the invention will be apparent from the following specification and the accompanying drawing which is for the purpose of illustration only.

Brief description of the drawing

FIG. 1 is an isometric view of a preferred embodiment of the baby food jar holder according to the principles of the present invention;

FIG. 2 is an enlarged, vertical, sectional view looking in the direction of the arrows 2—2 in FIG. 1 and showing a jar positioned in the holder, said jar being shown in phantom lines;

FIG. 3 is a sectional view looking in the direction of the arrows 3—3 in FIG. 2; and FIG. 4 is a fragmentary, top plan view of the jar gripping means, with a jar peripherally gripped and retained therein.

Description of the best embodiment contemplated

Referring to the drawing, the embodiment of the baby food jar holder of the present invention includes a base, generally indicated at 10, which is preferably of molded plastic, hollow in bottom plan, so as to form a lower edge-supporting surface or surfaces 12 for supporting the base on a horizontal surface. Within a hollow interior, generally indicated at 14, of the base 10 and interiorly of the lower or bottom edge surfaces 12 is a downwardly extending, cylindrical stub 16 which is telescoped centrally within a relatively large diameter, resilient material suction cup 18 having a downwardly exposed suction surface 20 thereof effectively coplanar with the base lower edge surfaces 12. Thus, the base 10 may be positioned on a horizontal surface and with slight downward pressure, the suction cup 18 will tightly adhere to said horizontal surface for securely retaining the jar holder against movement.

The upper surface of the base 10 is formed with a pair of laterally spaced jar receiving surfaces 22 which, of course, are upwardly exposed and are preferably slightly forwardly angled relative to the plane of the base lower edge surfaces 12 and suction cup suction surface 20. The jar receiving surfaces 22 are separated by an upwardly extending pedestal 24, which is likewise forwardly angled in its upward projection generally normal to the jar receiving surfaces 22.

A jar gripping bar 26, also preferably molded from plastic, is secured to the upper extremity of the pedestal 24, preferably by being partially downwardly telescoped over the pedestal 24 and secured therto by a pair of molded rivets 28. The jar gripping bar 26 is laterally positioned aligned with the base jar receiving surfaces 22 and includes opposite split-ring ends 30 and 32 spaced above and overlying the jar receiving surfaces 22, as well as in planes of parallel angled alignment with said surfaces.

Due to the plastic composition of the split-ring ends 30 and 32 and the relatively thin cross section thereof, said ends are resilient and, furthermore, the interior size or diameter of the split-ring end 30 is preferably larger than the interior size or diameter of the split-ring end 32.

Thus, the combination of the jar receiving surfaces 22 on the base 10 and the upwardly aligned split-ring ends 30 and 32 on the jar gripping bar 26 effectively constitute spaced socket-like jar receiving receptacles for the reception of baby food jars downwardly therein, such as jar 34 shown in phantom lines in FIG. 2 and in full lines in FIG. 4. As shown, the bottoms of said jars will rest downwardly against the jar receiving surfaces 22 and the split-ring ends 30 and 32 of the jar gripping bar 26 will be slightly spread by said jars so that said jars will be resiliently, peripherally gripped by said split-ring ends.

Interior surfaces of the split-ring ends 30 and 32 may be upwardly, angularly relieved, as at 36, for easy insertion of the jars 34 and the splitting of said split-ring ends, each split-ring end accommodating a limited range of jar sizes, one size range slightly larger than the other.

Rearwardly of the jar receiving surfaces 22 and the pedestal 24, the base 10 may be formed on the upper surface thereof with a spoon positioning surface 38, generally laterally aligned with the jar receiving surfaces and pedestal. A molded plastic spring clip 40 is secured to and extends upwardly from the base 10 laterally, centrally overlying the spoon surface 38 for the resilient retainment of a usual feeding spoon 42 on said spoon surface.

According to the present invention, therefore, we have provided a baby food jar holder which will conveniently position jars of baby food of varying size so that the contents thereof may be removed by a mother feeding a baby without the necessity of the mother retaining the baby food jar in one hand. Furthermore, the efficient, but relatively economical construction, makes possible the provision of the baby food jar holder at a minimum of manufacturing and material cost.

We claim:

1. In a baby food jar holder, the combination of: a base having a pedestal projecting upwardly therefrom; upwardly exposed jar receiving surfaces on said base at sides of and spaced apart by said pedestal; a gripping bar secured on said base pedestal spaced above said receiving surfaces and having ends overlying said receiving surfaces, each of said bar ends including ring means circumferentially resiliently expansible for peripherally gripping sides of jars inserted therethrough and downwardly against said base receiving surfaces; and downwardly facing suction cup means mounted on said base underlying said pedestal, said suction cup means being upwardly recessed within base lower supporting surfaces in operative parallel alignment with said supporting surfaces for retaining said base on a flat surface.

2. A jar holder as defined in claim 1 in which said ring means on said bar ends each include resilient material split rings expansible for gripping said jar sides.

3. A jar holder as defined in claim 1 in which one of said ring means on said bar ends is larger in internal diameter than the other of said ring means on said bar ends for peripherally gripping sides of different selected size jars.

4. A jar holder as defined in claim 1 in which a spoon receiving surface is formed on said base extending adjacent said pedestal and said jar receiving surfaces, said spoon receiving surface having resilient clip means overlying said surface for retaining a spoon positioned on said surface and extending adjacent said pedestal and said jar receiving surfaces.

5. In a baby food jar holder, the combination of: a base having lower supporting surfaces adapted for supporting said holder on a generally horizontal surface and laterally spaced upper jar receiving surfaces angled from parallel relationship with said lower supporting surfaces, said jar receiving surfaces being separated by and upwardly projecting center pedestal formed on said base; and resiliently actionable jar gripping means mounted on said base center pedestal spaced above and overlying each of said base jar receiving surfaces for resiliently gripping the peripheries of jars inserted downwardly through said gripping means and against said base jar receiving surfaces to permit the secure retainment of jars of varying size projecting angularly upwardly from said base resting on said base jar receiving surfaces, said jar gripping means being positioned by said base center pedestal aligned actionable in generally parallel relationship with said base jar receiving surfaces.

6. A jar holder as defined in claim 5 in which one of said jar gripping means is of a different size than the other of said jar gripping means for resiliently gripping the peripheries of jars of different size ranges.

7. A jar holder as defined in claim 5 in which downwardly facing suction cup means is mounted on said base underlying said pedestal, said suction cup means being upwardly recessed within said base lower supporting surfaces in operative parallel alignment with said supporting surfaces for retaining said base on said generally horizontal surface.

8. In a baby food jar holder, the combination of: a base having lower supporting surface means adapted for supporting said base on a generally horizontal surface; upwardly open jar socket means on said base extending upwardly at an angle from perpendicular to said base lower supporting surface means for receiving at least the lower part of a jar angularly downwardly therein; and said jar socket means including at least a partially recessed upwardly exposed jar receiving surface on said base angled from parallel relationship with said lower supporting surface means, resiliently actionable jar gripping means supported on said base spaced above said upwardly exposed jar receiving surface aligned for peripherally gripping and retaining jars of varying size inserted angularly downwardly into said jar socket means, said jar gripping means being positioned resiliently actionable against said jar peripheries generally parallel to said jar receiving surface to properly angularly retain said jars resting on said jar receiving surface.

9. A jar holder as defined in claim 8 in which said jar socket means includes at least two upwardly open jar socket means extending angularly upwardly from said base laterally separated by a central pedestal formed on said base, each of said jar socket means having said partially recessed angular jar receiving surface adjacent said pedestal and said parallel actionable jar gripping means supported on and extending laterally from said pedestal.

10. A jar holder as defined in claim 8 in which said jar socket means includes at least two upwardly open jar socket means extending angularly upwardly from said base laterally separated by a central pedestal formed on said base, each of said jar socket means having said partially recessed angular jar receiving surface adjacent said pedestal and said parallel actionable jar gripping means supported on and extending laterally from said pedestal; and in which one of said jar gripping means of different size than the other of said jar gripping means for resiliently gripping the peripheries of jars of different size ranges.

References Cited

UNITED STATES PATENTS

| | | | |
|---|---|---|---|
| 855,565 | 6/1907 | Greenhouse | 211—74 X |
| 1,657,968 | 1/1928 | Linsemeyer | 211—60 |
| 1,712,577 | 5/1929 | Moffa | 211—74 |
| 2,574,340 | 11/1951 | Martin | 211—69.5 |
| 2,743,729 | 6/1956 | Butler | 248—206 |
| 3,261,380 | 7/1966 | Holleman | 248—313 X |

FOREIGN PATENTS 611,653  11/1948  Great Britain.

CHANCELLOR E. HARRIS, Primary Examiner

U.S. Cl. X.R.

248—206, 313